C. W. WILLIAMS, Jr.
AUTOMATIC SAFETY FENDER FOR MOTOR VEHICLES.
APPLICATION FILED APR. 18, 1922.
1,429,055.
Patented Sept. 12, 1922.
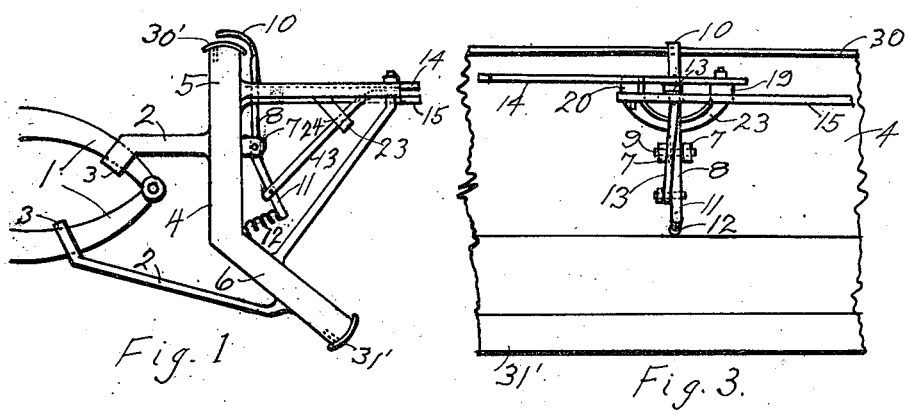
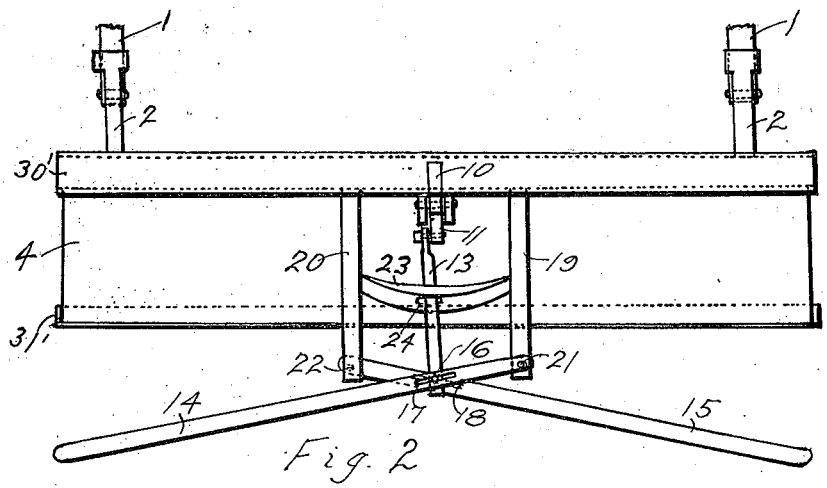
INVENTOR
Charles W. Williams Jr.
BY
Chas. W. Mortimer
ATTORNEY C. W. WILLIAMS, Jr.
AUTOMATIC SAFETY FENDER FOR MOTOR VEHICLES.
APPLICATION FILED APR. 18, 1922.

INVENTOR
Charles W. Williams, Jr.
BY
Chas. W. Mortimer
ATTORNEY

Patented Sept. 12, 1922.

1,429,055

UNITED STATES PATENT OFFICE.

CHARLES W. WILLIAMS, JR., OF MONTCLAIR, NEW JERSEY.

AUTOMATIC SAFETY FENDER FOR MOTOR VEHICLES.

Application filed April 18, 1922. Serial No. 555,429.

*To all whom it may concern:*

Be it known that I, CHARLES W. WILLIAMS, Jr., a citizen of the United States, residing at Montclair, in the county of Essex and State of New Jersey, have invented certain new and useful Improvements in Automatic Safety Fenders for Motor Vehicles, of which the following is a specification.

This invention relates to a device that may be attached to an automobile or other vehicle to render the same more safe for pedestrians and aid in the avoidance of fatal accidents.

One of the objects of this invention is to provide a safety device that will operate automatically so as to prevent a pedestrian from being run over by a vehicle when struck thereby.

Another object is to provide a safety fender that will occupy a relatively small space in its normal or closed position and at the same time will not present an unsightly appearance or interpose an inordinate surface to cause an increase in the amount of air friction.

Another object is to provide a lever or a system of levers for operating the safety device, which levers may also serve as a bumper for the car to which the device is attached.

The invention will be understood from the description in connection with the accompanying drawings, in which—

Figure 4:
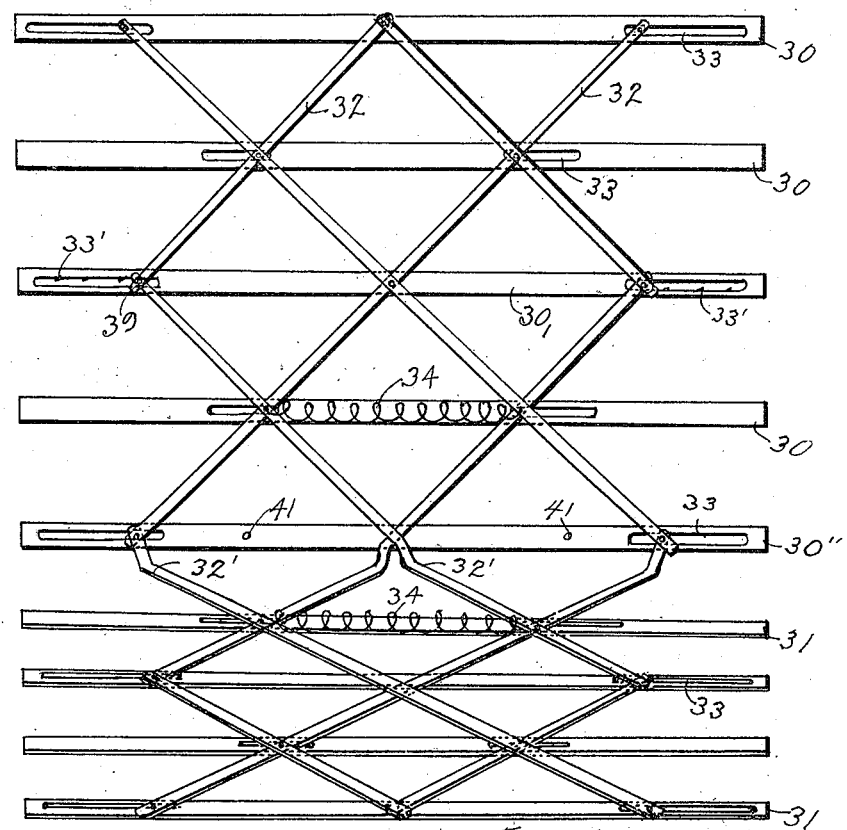
Figure 5:
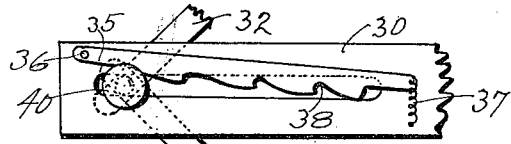

Fig. 1 is a side view of the device.
Fig. 2 is a plan view of the same.
Fig. 3 is a fragmentary front elevation.
Fig. 4 is a detail view of certain parts.
Fig. 5 is a side view of a modified feature,
Fig. 6 is an edge view of the same.

In the drawings reference character 1 designates the springs of an automobile to which the device may be attached by extensions 2 which are fastened to the springs by straps 3. The outer end of the extensions 2 are rigidly connected to a casing or housing 4, in which housing is mounted an expansible frame-work to be described more in detail below. The housing is provided with a vertical channel 5 and another channel 6 disposed at an angle to the channel 5, in which channels the expansible frame work is mounted. On the front side of the housing 4 are two lugs 7 spaced apart slightly, and between the same is mounted the catch 8 so as to turn upon the pivot 9. The catch 8 has an extension 10 projecting over the top of the housing and an extension 11 between which and the housing is interposed a compression spring 12. The extension 11 is connected by the strap 13 to two levers 14 and 15 by means of a pin 16 rigidly attached to the strap 13 and passing through slots 17 and 18 in the levers 14 and 15. Two rigid extensions 19 and 20 are provided on the front of the housing 4 and the ends of the levers 14 and 15 are pivoted to the ends of these extensions, as shown at 21 and 22. The extension 19 may be placed in a slightly lower plane than the extension 20, and the lever 14 is pivoted above the extension 19, while the lever 15 is pivoted below the extension 20 so that the ends of the two extensions 19 and 20 will operate as stops for the respective levers 15 and 14 in one direction. The extensions 19 and 20 are connected by a curved bar 23 which may be provided with a hole 24 through which the strap 13 extends.

The expansible frame-work or toggle mechanism consists of a series of parallel bars 30 disposed in one plane and a series of parallel bars 31 disposed in a plane as shown in Fig. 4 at an angle to the first plane. The first bar 30 may be provided with a curved plate 30' rigidly connected thereto and the last bar 31 may be provided with a curved plate 31' rigidly connected thereto, these plates 30' and 31' serving as covers for the open ends of the channels 5 and 6 when the device is in its normal position (Fig. 1). The frame-work may be maintained in the housing 4 by having pins or rods 41 extend through the sides of the housing and through the middle bar 30" as this bar will not need to move in either direction when the frame-work is expanded. The bars 30 and 31 are interconnected by a series of cross-bars 32, which are pivoted together where they cross each other, and are pivoted to the middle portion of the alternate bars 30 and 31. Some of the bars 32 are bent as indicated at 32' so as to adapt the frame-work to the two channels 5 and 6 of the housing 4. The ends of the bars 32 are also pivoted together and these pivots, as well as some of the pivots at the crossed portions, extend through slots 33 in the bars 30 and 31, as indicated, and have their ends enlarged, as shown more clearly at 40 (Fig. 6). In this way a pantograph-like frame-work is provided, in which the bars 30 and 31 can be caused to approach or recede from each other while being maintained parallel to each other. The cross-bars may be connected by a series of tensile springs 34 so as to tend normally to expand the frame-work. One or more of the slots 33 may be provided with notches 33' to operate as a lock for the frame-work in its expanded position by the shank of the corresponding rivet dropping into these notches when the frame work is in its extended position. In order to cause this operation to take place, the left hand end of the bar $30_1$, for example, may be made heavier than the right hand end, or a spring may be interposed to cause the shank 39 of the rivet to catch behind the projections 33'.

Figure 6:
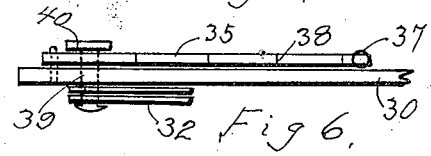

In the modifications shown in Figs. 5 and 6, instead of having notches along the side of the slots, a lever 35 may be pivoted to the bar 30 at 36, the other end of this lever 35 being drawn downward by the spring 37 so that the notches 38 will be interposed in the path of the rivet shank and be caught thereby.

The operation is as follows:

The expansible frame is normally retained in the housing 4 in its closed position, as indicated in Fig. 1, with the catch 10 extending over the top of the housing and retaining the frame closed. In this way the expansible frame-work is protected from the rain. In case a pedestrian is struck by one of the levers 14 or 15, the same will operate the catch through the strap 13, thereby permitting the springs 34 to expand or extend the frame-work so that the lower portion will come almost, if not entirely, to the ground and the upper portion will extend approximately to the proper height, thus causing the lower portion to catch the person if he has fallen, or the upper portion will prevent him from falling over and behind the housing and therefore under the wheels. In case the bars 30 or 31 strike a pedestrian before the frame-work has expanded to its full extent, the locking device shown at 33' (or at 35 in Fig. 5) will maintain the frame in the position to which it has extended or expanded. When the levers 14 and 15 have moved into contact with the extensions 19 or 20, they then serve as a bumper for the car. When it is desired to proceed, the frame-work is compressed, the catch 38 having been released, and when it has been compressed within the housing, the catch 10 is caused to pass over the top of the same and hold it therein.

What I claim and desire to secure by Letters Patent is:

1. In a motor vehicle safety device, a housing, an expansible frame in said housing, a catch for holding said frame in its closed position, and a pivoted lever connected to said catch extending in front of said vehicle.

2. In a motor vehicle, an expansible frame, said frame being anchored intermediate its edges to a support to permit it to expand in opposite directions, a spring actuated catch to hold said frame in its closed position, a pivoted lever connected to said catch and adapted to release it when said lever is pressed.

3. In a motor vehicle safety device, a housing, a spring-actuated expansible frame in said housing, a spring-actuated catch mounted on said housing, a lever pivoted at one end and connected to said catch at a point intermediate its ends and adapted to release said catch when said lever is pressed.

4. In a motor vehicle safety device, a frame expansible in opposite directions in two planes at an angle to each other, a catch for holding said frame in its closed position, and means for releasing said catch.

5. In a motor vehicle safety device, an expansible frame, a catch for holding said frame in its closed position, and crossed pivoted levers connected to said catch extending in front of said vehicle.

6. In a motor vehicle safety device, a housing, an expansible frame in said housing, said frame being anchored intermediate its edges to a support to permit it to expand in opposite directions, means for holding said frame in its closed position, and means operated by contact with an object to release said holding means.

7. In a motor vehicle safety device, an expansible frame, means for holding said frame in its closed position, a pivoted lever extending in front of said frame operated by contact with an object to release said holding means, and means comprising a notched member for automatically locking said frame in its expanded position.

8. In a motor vehicle safety device, an expansible frame, means for holding said frame in its closed position, means operated by contact with an object to release said holding means, and a catch on a member in said frame for automatically locking said frame in its expanded position.

9. In a motor vehicle, a housing, an expansible frame anchored near the middle of said housing at points intermediate the edges of said frame, cover plates carried by the edges of said frame for closing the upper and lower portions of said housing, a catch for holding said frame in its closed position, and means for releasing said catch when an object is struck.

In testimony whereof I affix my signature.

CHARLES W. WILLIAMS, Jr.